(No Model.) 3 Sheets—Sheet 1.

W. H. H. FRYE.
CLOTH MEASURING DEVICE.

No. 316,887. Patented Apr. 28, 1885.

ATTEST.
J. Henry Kaiser.
Wm. W. Garner.

INVENTOR.
William H. H. Frye.
by J. Deane
Attorney (No Model.) 3 Sheets—Sheet 2.

W. H. H. FRYE.
CLOTH MEASURING DEVICE.

No. 316,887. Patented Apr. 28, 1885.

ATTEST-
J. Henry Kaiser.
Wm A. Garner

INVENTOR-
William H. H. Frye.
by L. Deane
Attorney (No Model.) 3 Sheets—Sheet 3.
W. H. H. FRYE.
CLOTH MEASURING DEVICE.
No. 316,887. Patented Apr. 28, 1885.
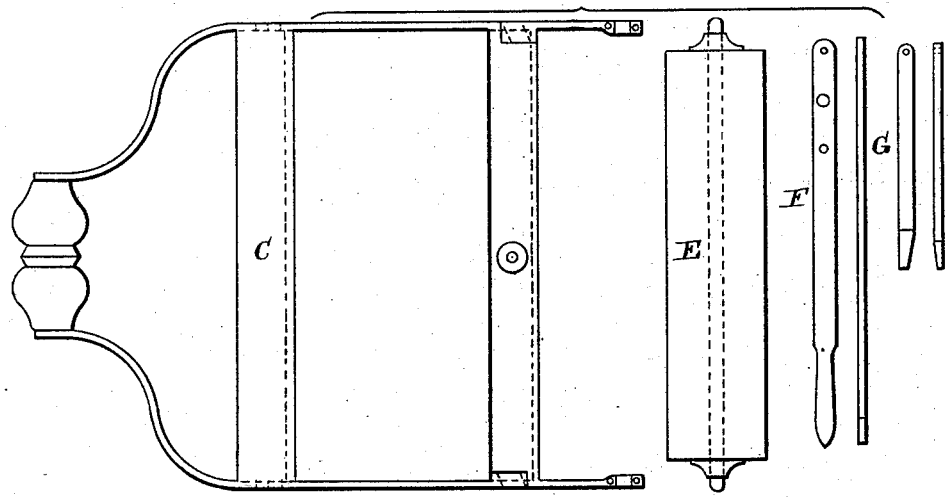
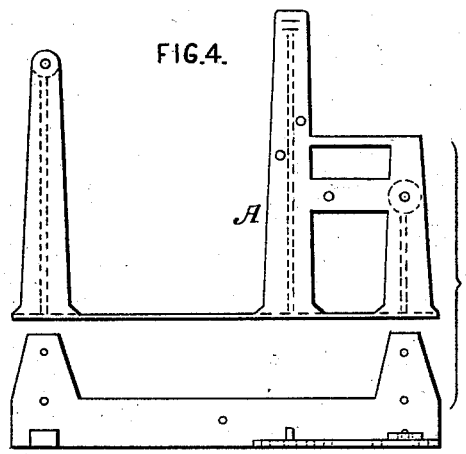
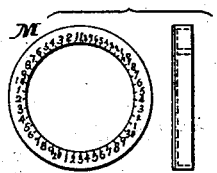
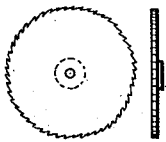
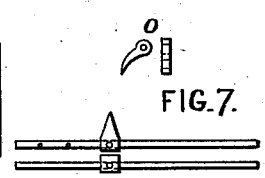
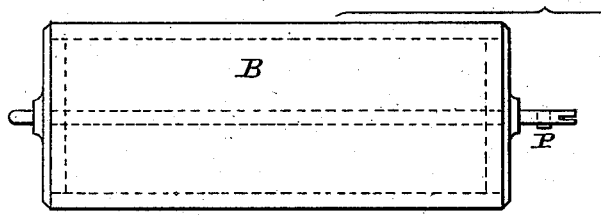
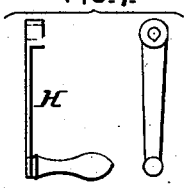
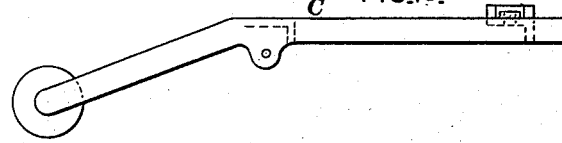
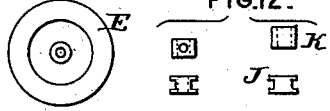
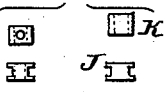
N. PETERS, Photo-Lithographer, Washington, D. C.

UNITED STATES PATENT OFFICE.

WILLIAM H. H. FRYE, OF KANSAS CITY, MISSOURI.

CLOTH-MEASURING DEVICE.

SPECIFICATION forming part of Letters Patent No. 316,887, dated April 28, 1885.

Application filed December 27, 1884. (No model.)

*To all whom it may concern:*

Be it known that I, WILLIAM H. H. FRYE, a citizen of the United States, residing at Kansas City, in the county of Jackson and State of Missouri, have invented certain new and useful Improvements in Cloth-Measuring Devices, of which the following is a specification, reference being had therein to the accompanying drawings.

Figure 1:
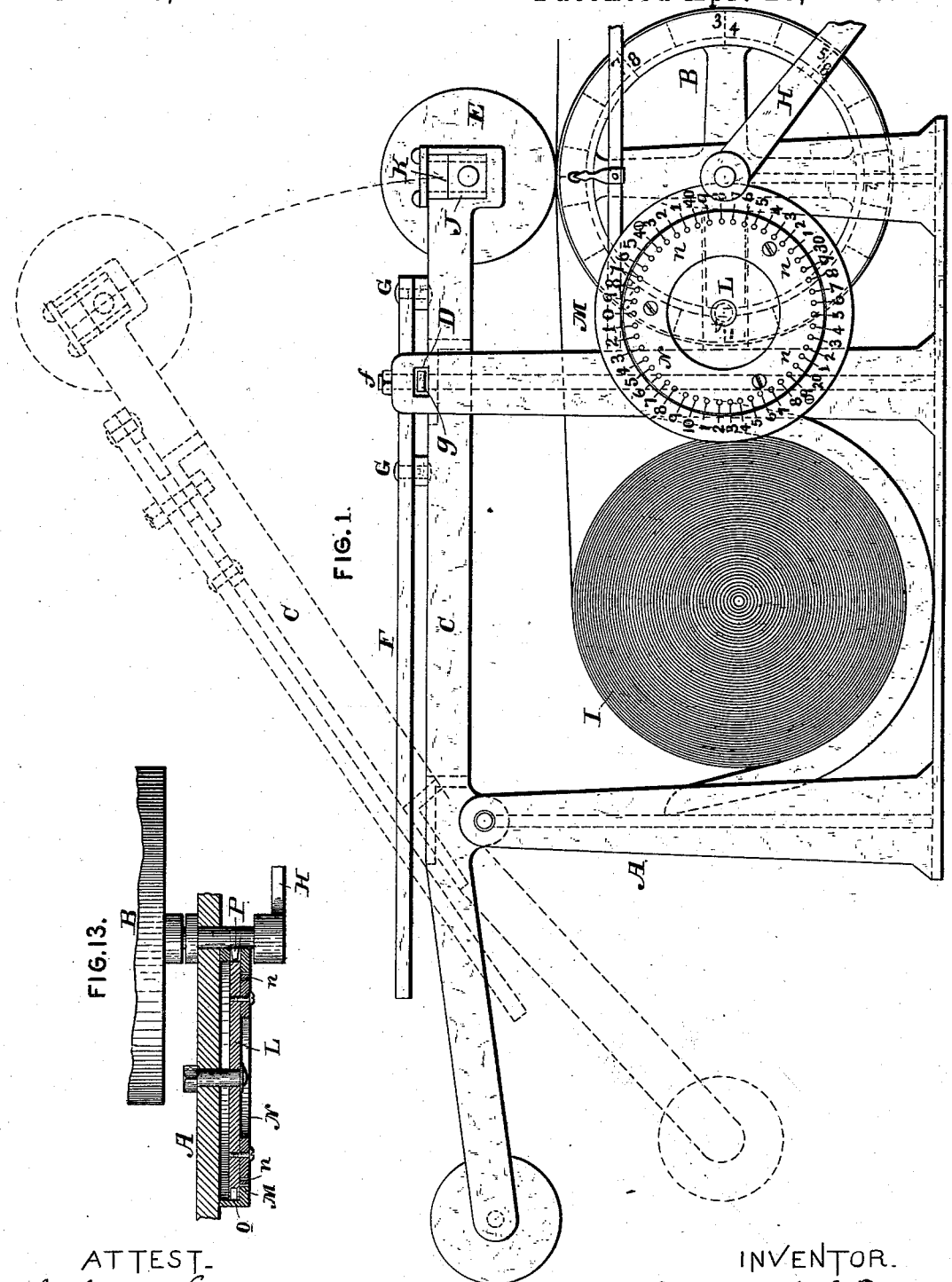
Figure 2:
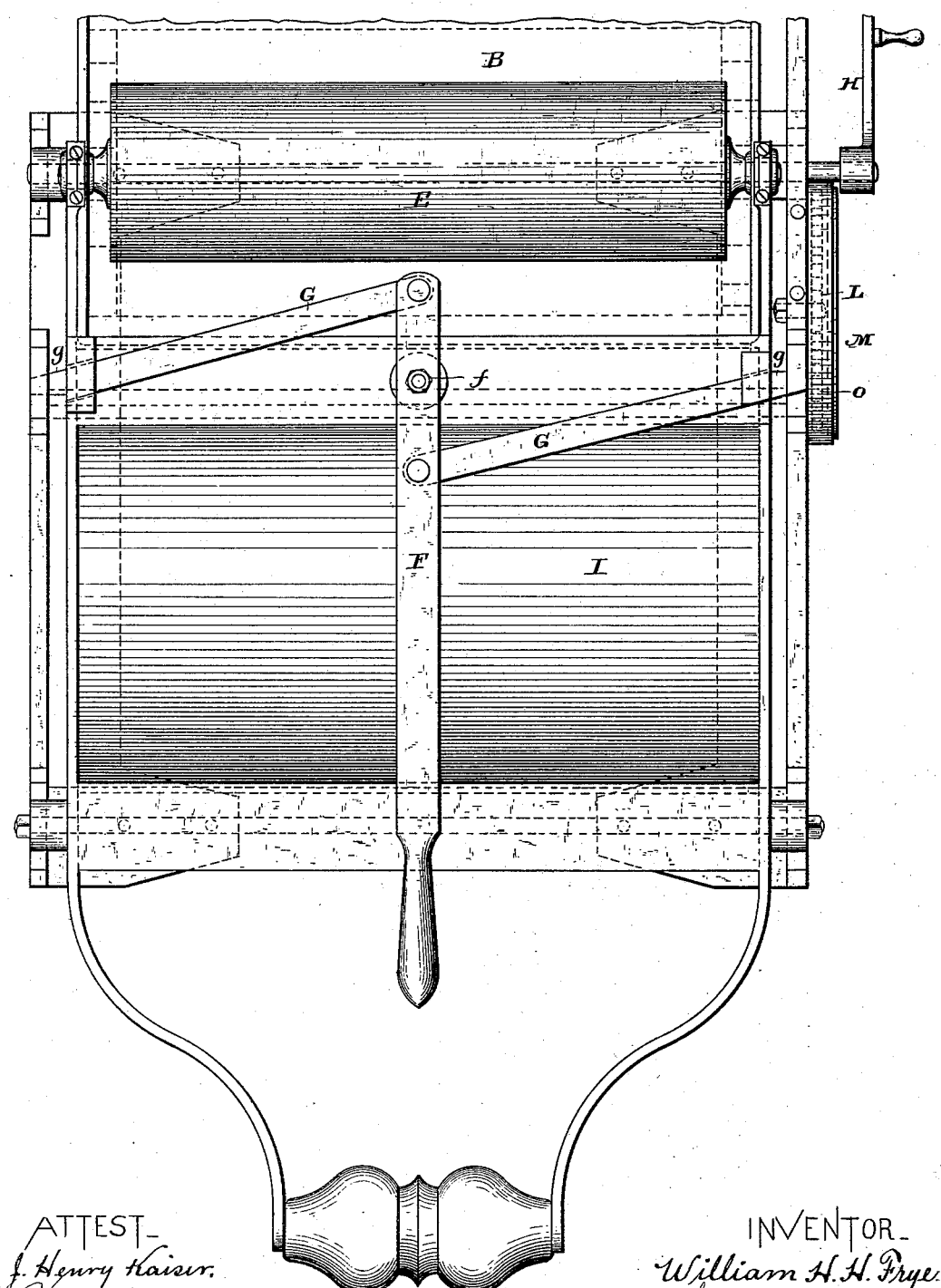

Figure 1 is a side elevation of the machine. Fig. 2 is a top plan of the machine. Figs. 3, 4, 5, 6, 7, 8, 9, 10, 11, and 12 are details showing the parts that go into the construction of the machine; Fig. 13, a detail of the register.

This invention is designed to produce a machine that will measure cloth of all kinds accurately and without loss to either the purchaser or the seller; and the points of novelty consist in the construction and combination of the several parts of the machine, all as will now be set forth and explained.

In the drawings, A denotes the frame that supports the cylinder B, which, in conjunction with the cylinder E, does the measuring, said cylinder B usually being three feet or one yard in circumference. The tilting frame C supports the friction-cylinder E, and the levers F and G G denote the means of locking the tilting frame C to the supporting-frame A, by which means the cylinders B and E are pressed together with sufficient force to produce friction enough to draw the fabric forward as they are revolved by means of crank H. The outer ends g, of lever-arms G G are wedge-shaped, and as they are driven through slots D D in frame A they bear the cylinder B upon cylinder E to any desired pressure by the greater or less movement of the lever F. The lever F is hung in its fulcrum f to tilting frame C, and the lever-arms G G are properly fastened to the lever.

I denotes the cradle in which the bolt of cloth is placed to unroll as it is drawn forward by the revolving of the cylinders B and E. To place the roll or bolt of cloth in the cradle, unlock the tilting frame from the main frame by moving the lever F from the operator, thus drawing the ends of the lever-arms G G from the slots D-D in the frame A; then tip the tilting frame C until it stands to an angle of about forty-five degrees; then place the bolt of cloth over the cylinder B, letting it fall into cradle I; then drop the tilting frame C, and lock securely to the frame A by bringing the lever F toward the operator and pressing the wedge ends of the lever-arms G G through the slots D D in frame A.

On the front end of tilting frame C, and directly over the movable boxes J J, in which run the journals of the cylinders E, is placed rubber packing K, to allow of the cylinder being distended sufficient to admit of any thickness of cloth to pass between them. It will be noticed in the drawings that the rear end of tilting frame C extends back of the fulcrum, and is of sufficient weight to produce a balance.

In connection with and attached to frame A is the register, composed of ratchet L, numbered circle M, revolving dial N, and pawl O. The circle M is rigidly secured to the frame A. The dial N is secured rigidly to the ratchet L, which is operated by sprocket P on the shaft of the cylinder B. The dial N, being placed inside of circle M and having as many holes *n* as there are numbers on circle M, is revolved one tooth of the ratchet every revolution of cylinder B. The number of teeth on the ratchet L are same in number as there are spaces and holes in dial N and numbers on circle M. The ratchet is held from backward motion by pawl *o*.

To designate the number of yards measured, place a pin or peg in the hole opposite the number 0. To find the number of yards measured, look at the number to which the pin stands opposite on circle M, as each revolution of the cylinder B moves the ratchet and dial one number.

The number of holes in dial N and circle M is optional with the manufacturer. For practical use, however, fifty is found to be a very convenient number.

The end of cylinder B next to the operator is divided into spaces to designate the fractional part of a yard, as shown by the drawings.

Having thus described my invention, what I consider new, and desire to secure by Letters Patent, is—

1. The locking wedge end levers, in combination with the tilting frame, whereby the said frame can be locked securely to the main and supporting frame, substantially as described.

2. In a machine for measuring cloth, the combination, with a tilting frame and a device for locking the same to the main frame, of an upper yielding cylinder and a lower cylinder, substantially as described.

3. The combination, with the two cylinders, between which the cloth is passed while being measured, of a tilting frame, balanced as described, and a locking device therefor, substantially as specified.

4. The combination, in a cloth-measuring machine, of a concave cradle, devices for registering the measure, the cylinders between which the cloth is moved while being measured, a tilting frame bearing the upper cylinder, E, and a device for locking this frame to the main frame of the machine, substantially as described.

5. In a device as described, two cylinders or rollers, combined with levers, locking-wedges, and a tilting frame, substantially as described.

6. The combination, with devices for registering cloth while being measured, of a cylinder having fixed journal-bearings in the main frame, a cylinder having elastic pressure-bearings on the end of a tilting frame, and means for locking this tilting frame to the main frame, substantially as described.

7. The combination, in a cloth-measuring machine, of the cylinder B, having on one end a device for registering fractions of a yard, a sprocket, P, on the shaft of this cylinder, a ratchet, L, a numbered circle, M, the revolving perforated dial N, adapted to receive a pin, and the pawl O, all as described.

In testimony whereof I affix my signature in presence of two witnesses.

WILLIAM H. H. FRYE.

Witnesses:
WILLIS H. LEAVITT,
FREDK. BAKER.